June 13, 1950
J. C. HOLMES
2,511,635
HEATING SYSTEM
Filed June 25, 1948
3 Sheets-Sheet 1
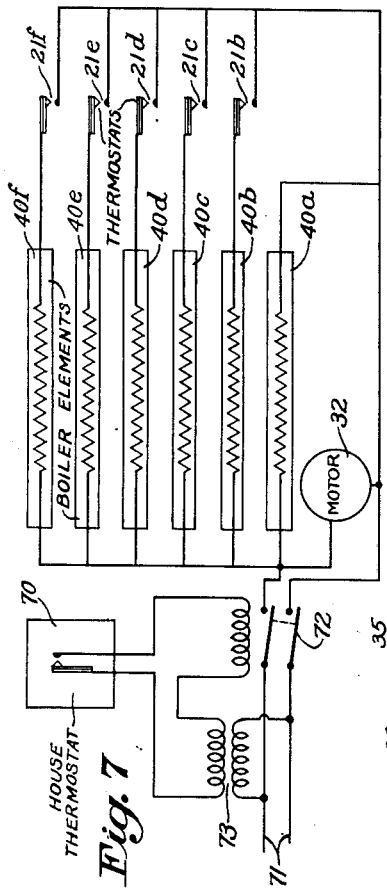
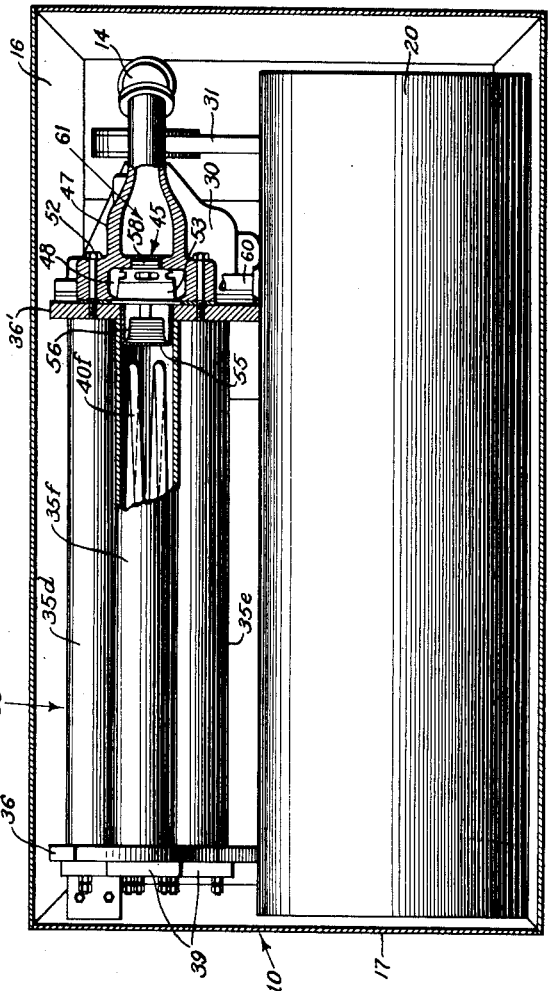
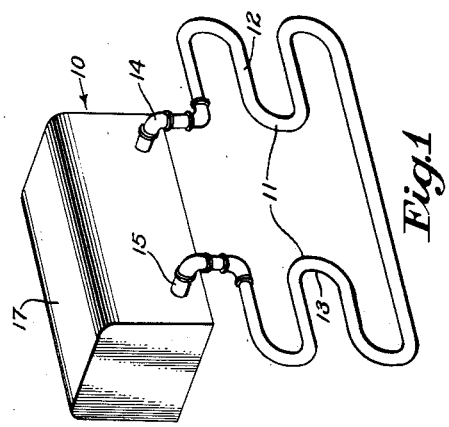
Inventor
John C. Holmes
By Mason, Fenwick & Lawrence
Attorneys June 13, 1950

J. C. HOLMES 2,511,635

HEATING SYSTEM

Filed June 25, 1948

Inventor
John C. Holmes

By Mason, Fenwick & Lawrence
Attorneys

June 13, 1950     J. C. HOLMES     2,511,635
HEATING SYSTEM

Filed June 25, 1948     3 Sheets-Sheet 3

Inventor
John C. Holmes
By Mason, Fenwick & Lawrence
Attorneys

Patented June 13, 1950

2,511,635

UNITED STATES PATENT OFFICE 2,511,635

HEATING SYSTEM

John C. Holmes, Signal Mountain, Tenn.

Application June 25, 1948, Serial No. 35,262

7 Claims. (Cl. 219—38)

The present invention relates to a heating system and more particularly to a system utilizing a circulating heating medium in which the temperature of the heating medium is automatically regulated in accordance with the temperature desired in the space or room being heated.

It is common practice in heating systems to utilize a thermostat in the room or area to be heated for the purpose of controlling the heat applied to the heating medium. In these prior conventional heating systems, in most instances the heating medium starts to circulate as soon as the room thermostat calls for additional heat. Also, in these prior systems it is conventional practice for the room thermostat to initiate the heat means such as the gas burner, electrical heater or the like to the extent that it is intermittently operated at its full capacity. In other words, when the temperature in the room falls below a predetermined set value, the entire heating means is operated to raise the temperature of the heat conveying means such as water or hot air. When the room temperature rises to a predetermined value such heating means is rendered inoperative. Consequently, the room or areas are subjected to considerable variation in temperature even with the most sensitive practical heat control. In such arrangements in hot water heating systems the room temperature will be maintained by the heat being given up by the hot water and it is necessary for the temperature of the water to be lowered before the room thermostat will again operate to initiate the heating means. Consequently there will be considerable lag in time after the heating means is again initiated before any substantial amount of heat is delivered through the heating system to the room. This time lag makes it difficult to maintain a uniform temperature in the room within close limits. Furthermore, it necessitates, in the case of electrical heating means, a heavy intermittent load to be applied to the power lines which in certain areas might be quite undesirable.

In accordance with the present invention the heating means is adapted to supply a small increment of heat energy to the heating medium more or less in step with the temperature variations in the room or area being heated. The heating means comprises a plurality of units, the total capacity of which is that needed for the system. After the desired temperature is developed in the heating medium, the individual units come into sequential operation in response to the temperature requirements in the room being heated. In this way a much more even temperature is maintained.

The heating medium is raised to a predetermined temperature before it is circulated through the radiating system. The room thermostat controls the circulation of the heating medium and the operation of one of the heating units. The operation of the other heating units is responsive to the temperature of the water returning from the radiating system.

Accordingly, an object of the present invention is the provision of a novel space heating system capable of substantially instantaneous response to space temperature variations to maintain constant temperature therein.

Another object of the present invention is the provision of a novel space heating system of simple construction, compact design, small operation and installation cost, capable of maintaining the temperature of the system and the space to be heated in close correspondence with a desired reference temperature without substantial variation therein.

Another object of the present invention is the provision of a novel space heating system having fully automatic thermostatic temperature regulation capable of varying the heat applied to the system in small corrective increments in accordance with correspondingly small variations in the temperature of the system from a selected reference temperature.

Another object of the present invention is the provision of a novel space heating system of the circulating water type operative to deliver water to the portions of the system adapted to radiate heat into the space to be heated only when such water is of the proper temperature to maintain the temperature in the space to be heated at its selected constant level.

Other objects, advantages and capabilities of the present invention will become apparent from the following detail description, taken in conjunction with the accompanying drawings, in which:

Figure 1 is a perspective view illustrating the heating unit and a heat radiating coil system embodying the present invention;

Figure 2 is a top or plan view of the electric heating unit, shown partially in section;

Figure 7 is a wiring diagram for the pump motor and electric heating units in the boiler units.

Figure 3:
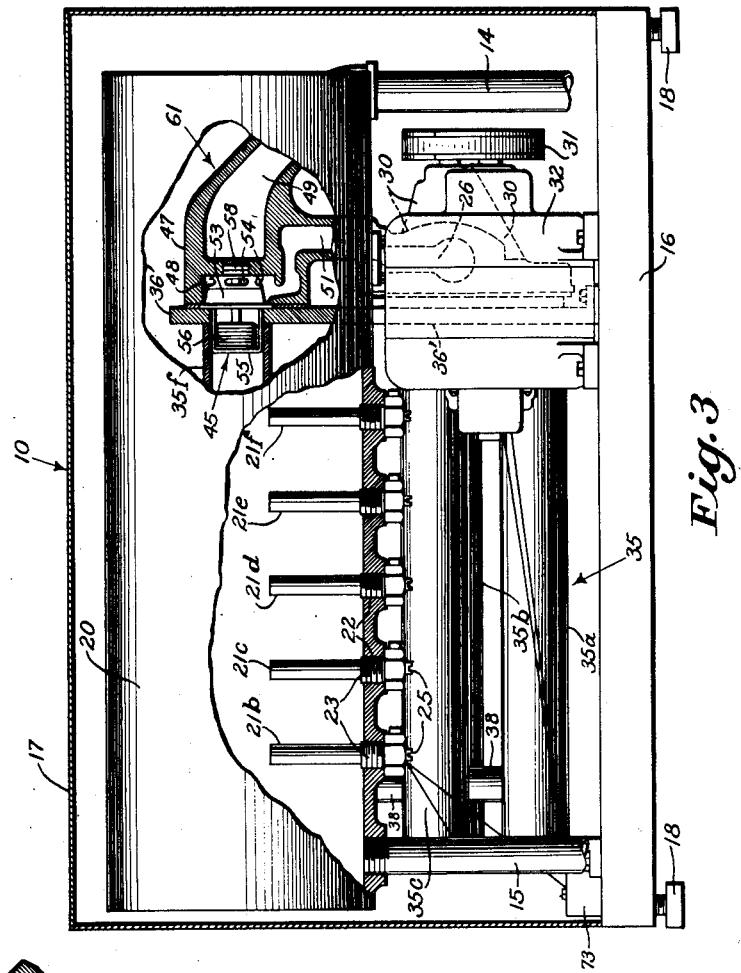
Figure 3 is a side view, partially in section and partially in elevation.

The present invention differs from the conventional heating system in that the invention utilizes a tank or reservoir for the heating system in which water or other desired heat exchange medium is raised to the desired temperature and is maintained at that temperature and is intermittently circulated to the radiating system in response to a thermostat in the room or areas to be heated. Broadly speaking, the invention comprises the tank or reservoir for the water or other heat exchange medium; a multiple unit boiler in which each boiler unit has an individual heating unit which is controlled in accordance with individual thermostats located in the tank or reservoir; and a pump for circulating the heat exchange medium from the boiler to the radiating system. The heat exchange medium is raised to a predetermined temperature before it is circulated through the radiating system and the temperature of the water or heat exchange medium is maintained at a predetermined temperature sufficient for maintaining a predetermined temperature in the room to be heated. To this end, a recirculating feature is provided whereby the water is continuously circulated through the boiler units and the reservoir until a predetermined temperature is reached at which time the water or heat exchange medium is circulated from the boiler to the radiating system. The room thermostat simultaneously controls the circulation of the heating medium and the operation of one of the heating units. The operation of the other heating units is responsive to the temperature of the water returning from the radiating system and the number of heating units which come into operation will be in accordance with the temperature of the water or heat exchange medium necessary to raise the temperature in the room to a predetermined value which is determined by the setting of the room thermostat.

In the embodiment of the invention shown in the drawings for illustrative purposes, the boiler units are arranged in zig-zag stacked relation with one above the other with all of the boiler units connected in series so that the water or other heat exchange medium can flow through each unit. In the embodiment illustrated, each boiler unit is provided with an electrical heating unit. The heating unit in the lowermost boiler unit is connected in parallel with the electric motor which operates the pump for circulating the heat exchange medium. Operation of each of the electrical heating units of the other boiler units is controlled, respectively, by one of the thermostats in the reservoir. Beginning with the thermostat which controls the second from the lowermost boiler unit, each thermostat is preferably set at a progressively higher temperature in the ascending order of the arrangement of the boiler units. The thermostats in the reservoir are arranged so that the one with the lowest setting is next to the inlet pipe of the reservoir and controls the heating unit in the next to the lowermost boiler unit. With this arrangement the one heater unit always operates when the room thermostat starts operation of the motor to circulate the heat exchange medium. As previously mentioned the water is not circulated from the boiler into the radiating system until the temperature reaches a predetermined temperature which opens a thermostat valve between the boiler and the radiating system. In the meantime the water is recirculated around and around through the boiler units. If the temperature of the water which is being recirulated is below the temperature at which the thermostat opens, all of the thermostats in the reservoir will close and will remain closed, thereby energizing all of the heating units (assuming that the room thermostat is closed) until the temperature has reached this predetermined point. After the thermostat valve opens the water will begin to circulate throughout the radiating system where heat is extracted from the water. The temperature of the water returning from the radiating system to the reservoir and thence into the boiler, will determine the number of heating units which will thereafter be energized. For instance, if the extraction of heat from the heat exchange medium as it flows through the radiating system is at a lesser rate than the rate at which heat is supplied by the heating unit in the lowermost boiler unit, all of the thermostats in the reservoir will remain open and as soon as the temperature in the room has reached the temperature at which the room thermostat is set, the pump motor and the heating unit in the lowermost boiler unit will be deenergized simultaneously. Thereafter, when the temperature in the room drops sufficiently to close the room thermostat, operation of the unit in the lowermost boiler and the pump motor will be initiated. In the event the weather should become cooler so that the rate of extraction of the heat from the heat exchange medium as it passes through the radiating system increases, the temperature of the water returning through the boiler will be lowered so that the one heating unit cannot maintain the temperature of the water in the reservoir. In this event the water returning from the radiating system will reduce the temperature of the water in the reservoir so that the thermostat with the next higher setting will close and thereby energize the heating unit in the next boiler unit. If these two units are unable to maintain the necessary temperature of the water in the reservoir, the other thermostats will be successively closed to assist in heating the water. Similarly, if it is desired to raise the temperature in the room, the room thermostat can be set up so that the pump motor and the one heater unit are energized. The pump continues to circulate the water through the radiating system where it is cooled and will continue to do so until the temperature in the room is raised to that at which the thermostat is set. In the meantime, the appropriate number of additional heating units will be energized through their respective thermostats in order to raise the temperature of the water sufficiently for the purpose of increasing the temperature in the room as soon as possible. Then again, after the temperature in the room has been raised to correspond to the setting of the thermostat, the pump motor circuit will be deenergized. As will be apparent from the circuit diagram, all of the heaters will be deenergized. Thereafter if the room thermostat again calls for additional heat, the pump motor and the one heating unit will be energized to supply heat to the radiating system. If the single unit is not sufficient to maintain the temperature of the water being circulated through the heating system, additional heating units will automatically be energized by their thermostats to raise the water temperature and this process will be repeated thereafter in accordance with temperature conditions and changes in the room thermostat setting. In accordance with the present invention, individual heating units are energized in response to the amount of heat required so that the full capacity of the heater is used only when needed, graduated corrective increments of heat being supplied in response to the small variations in heat requirement.

The present invention illustrated in the accompanying drawings is shown as adapted particularly to a domestic heating system for homes. The system occupies somewhat less space than conventional home heating plants, being thereby particularly adapted to use in small utility rooms. The system comprises a heating unit 10, including a boiler 35 which is made up of a plurality of separate boiler units, 35a, 35b, 35c, 35d, 35e, and 35f, a pump unit 30, the system reservoir or tank 20; and a heat radiating system represented by the radiating coils 12, 13 through which water (or other heat exchange medium) is circulated from the boiler and back to the reservoir 20. The coils 12, 13 may themselves constitute a closed circuit radiating system or may serve as conduits to a system of radiators for the water being conveyed from the heating unit 10 through the outlet pipe 14 to the coils 12, 13 and back to the heating unit 10 through the inlet pipe 15. The system described herein is particularly adapted to the so-called radiant heating systems in which the pipes such as those indicated at 12, 13 might be imbedded in monolithic slab sub-floors or walls of buildings or rooms.

One of the novel and salient features of the present invention is the provision of the reservoir 20, in which are the thermostatic controls for the heater units in the circulating system between the return from the radiating system and the return inlet to the boiler.

Referring particularly to Figures 2 to 5 inclusive, the heating unit 10 is mounted on a base 16 and is provided with a housing cover 17 which covers the component parts of the heating unit. Suitable adjustable supporting legs 18 in the form of threaded bolts having suitable heads which serve as feet are provided at the four corners of the base 16. The base 16 can be leveled by the relative adjustment of the supporting legs.

Disposed on a horizontal axis longitudinally of the housing cover 17 and in the upper portion thereof is the reservoir or tank 20 serving as the reservoir for water or other heat exchange medium for the heating system. The inlet pipe 15 for the water returning to the heating unit 10 from the radiating coils 12, 13 is coupled at the under-side of the left hand end of the reservoir 20 as shown in Figure 3.

Spaced laterally lengthwise of the reservoir 20 are a plurality of radially extending thermostats 21b, 21c, 21d, 21e and 21f. Each of these thermostats is provided with threaded portions which are threaded through openings 22 in the bottom wall of the reservoir 20. Each of the thermostats is provided with adjustment screws 25 through which the temperature at which the thermostat opens its electrical contacts can be manually varied. These thermostats are all of the same conventional commercial construction but are preferably set at progressively higher temperatures with the thermostat element 21b nearest the return from the radiating system, being set to open at the lowest temperature and each of the others being set to open at sequential, progressively higher temperatures. It is to be noted that the thermostatic element 21b with the lowest setting is arranged adjacent the inlet pipe 15 so that it is closest to the part of the reservoir into which the water returns from the radiating system. Since the exact details of the thermostat do not constitute part of the present invention, it is not believed necessary to describe these elements in detail. As will be described later, each of the thermostats is adapted to control the energization of one of the individual electric heater units of the individual boiler units.

Figure 4:
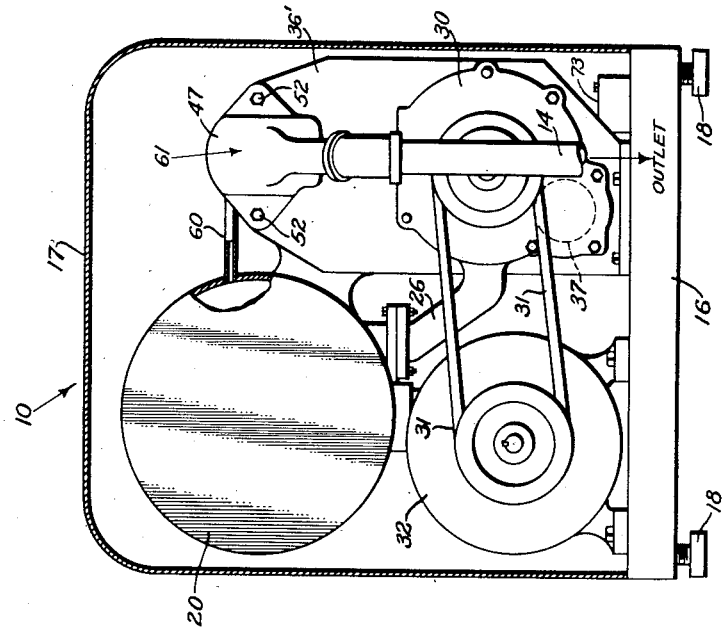
Figure 4 is a vertical view of the right hand end of the heating unit illustrated in Figure 2.
Figure 5:
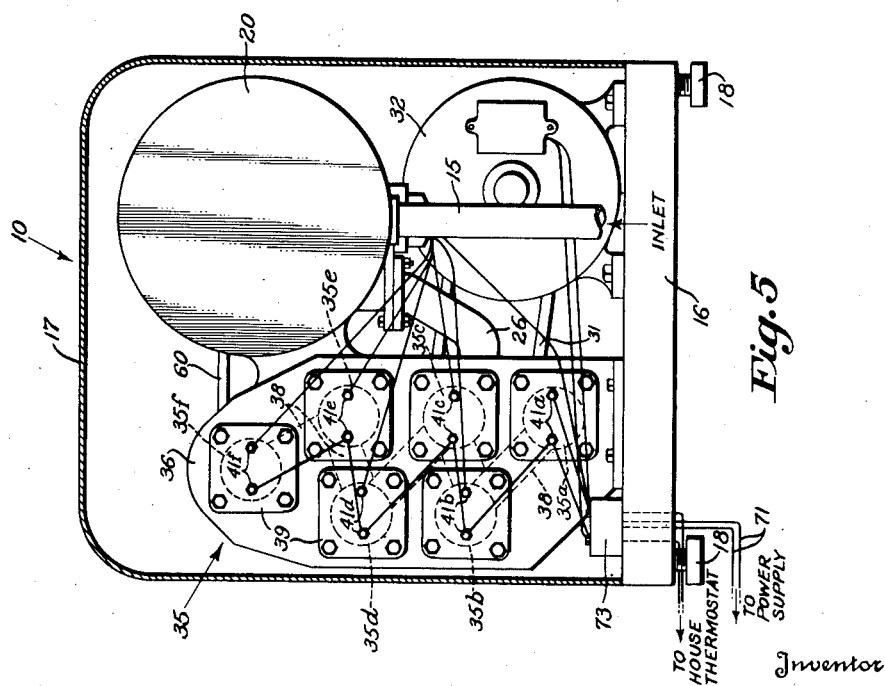
Figure 5 is a vertical view of the left hand end of the heating unit illustrated in Figure 2.

The opposite end of the tank 20 is provided with an outlet pipe 26 which connects the tank reservoir 20 to a circulating pump 30 which is mounted on one end of the lower heating unit 35a, as shown in Figure 4 with the discharge end of the pump opening directly into this boiler unit. The opening from the pump into the boiler unit is indicated by the dotted line 37 in Figure 4. The pump is operated by the electric motor 32 by means of the V-belt and pulley system 31.

The boiler units of the boiler 35, formed of cylindrical shells, are mounted on parallel axes and are spaced from each other vertically and laterally and are held in fixed relation by a pair of vertical supporting end brackets 36, 36' which are in turn supported by the base 16. Each of the boiler units is provided at its ends with flanged cover plates 39 which close the ends of the cylinders. The end plates are secured in position by suitable cap screws. The alternate adjacent ends of the boiler units are connected together by inter-connecting pipes 38 in such a manner that the units are all connected in series to permit the flow of water from the bottom unit up through each of the other units to the outlet indicated at 61.

Each of the boiler units 35a, 35b, 35c, 35d, 35e and 35f are provided respectively with electrical heater units 40a, 40b, 40c, 40d, 40e and 40f, having respective terminals 41a, 41b, 41c, 41d, 41e and 41f. Referring specifically to Figure 7, the electric heater unit 40a is connected in parallel with the motor 32 which operates the circulating pump 30. As has been mentioned previously, in a general way a room thermostat 70 simultaneously energizes the motor 32 and the electric heater unit 40a from a suitable power source 71. The circuit for the thermostat 70 which circuit also includes the circuit breaker 72, may be energized from the power source through the step down transformer 73 in conventional manner. It will also be noted that the other electric heater units 40b, 40c, 40d, 40e and 40f are respectively in series with reservoir thermostat elements 21b, 21c, 21d, 21e and 21f, the thermostats being adapted to control the energization of the associated electric heater units when the circuit to motor 32 is energized. In this connection it will be noted that one end of all of the electric heater units is connected to one side of the motor circuit and through the respective thermostats the other ends of the electric heater units are adapted to be connected to the opposite side of the motor circuit. Also, as has been mentioned in a general way, and as will be seen by reference to Figure 3, the reservoir thermostat 21b is arranged adjacent the inlet 15 to the reservoir through which the water returns to the reservoir from the heat radiating system. This area or part of the reservoir 20 immediately adjacent the inlet opening normally contains the coolest water. Each of the reservoir thermostats are preferably set to close at temperatures in a sequential progressively increasing series within a selected range of temperatures beginning with the thermostat element 21b which is set at the lowest temperature. Preferably there is a two degree variation between the setting of the adjacent thermostats for reasons which will be more specifically defined hereinafter. As an example, the thermostat element 21b may be set for a cut of temperature of about 80 degrees Fahrenheit.

Figure 6:
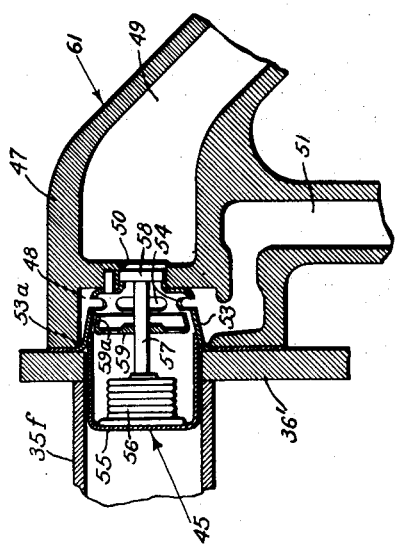
Figure 6 is a vertical sectional view of the portions of the heating unit associated with the thermostatic check valve controlling the flow of water through the heating system.

The outlet 61 of the upper boiler unit 35f through which the water passes from the boiler 35 into the outlet pipe 14 to the heat radiating system represented by the coils 12 and 13, is controlled by a thermostatic outlet valve 45, shown in detail in Figures 2, 3 and 6, which is adapted to cause recirculation of the water through the boiler 35 and into the reservoir 20 until a predetermined temperature has been reached at which time the thermostatic valve 45 opens to permit the heated water of the proper temperature to go into the heat radiating system. In general, the temperature at which this thermostatic valve operates is about 130 degrees Fahrenheit. Also this outlet 61 is provided with a suitable by-pass 60 which permits a small amount of water to be by-passed from the boiler into the reservoir when the outlet valve 45 is open to pipe 14 for the purpose of maintaining the desired temperature of the water in the reservoir 20. If desired, the by-pass 60 can be so connected to outlet 61 so that the water can recirculate to the reservoir at all times. The outlet 61 comprises a suitable valve seat housing 47 having a flange suitably secured to one end of the uppermost boiler unit 35f by means of suitable bolts 52, the housing having a suitable recess 48 formed therein and provided with an outlet channel 49 to which the outlet pipe 14 may be connected in any suitable manner. The recess 48 is in communication with the outlet channel 49 through a restricted aperture 50. A second by-pass channel 51 is also provided in the housing 47, the by-pass channel 51 being suitably connected to the inlet of the pump 30 whereby the water may be re-circulated from the boiler through the pump and back into the boiler when the thermostatic valve 45 closes aperture 50 and opens apertures 54. The thermostatic valve 45 comprises a valve casing member 53 having an outwardly extending flange 53a which is held in fluid-tight engagement between the supporting plate 36 and the flange of the valve housing 47 as shown in Figure 6. The main body of the valve casing member 53 is fitted into the recess 48 in the housing 47, the valve casing member 53 being provided with a plurality of apertures 54 in the sides thereof to permit the passage of the water into the recess 48 and thence into the by-pass channels 51 and 60 when the apertures 54 are uncovered by the valve, per se.

Secured to the valve casing member 53 is a U-shaped mounting bracket 55 which supports a thermostatic control bellows 56 of conventional construction. Extending forwardly into aperture 50 from the bellows 56 is a valve stem 57 having a valve disk 58 on the end thereof normally disposed in the aperture 50 and resting against the forward end of the valve casing member 53 in such a position as to close the aperture to the flow of water. A second valve disk member 59 in the form of a disk having a frusto-conical flange 59a is fixed to the valve stem between the forward end of the bellows 56 and the valve disk 58. The web of the valve disk 59 is provided with suitable apertures to facilitate the flow of water regardless of the position of the thermostatic valve 45. The valve disk member 59 is so positioned on the valve stem 57 that when the valve disk 58 is against the forward end of the valve casing member 53, the flange 59a of the valve disk member 59 will uncover the apertures 54. It will be apparent that when the valve member 59 closes the apertures 54, the valve disk 58 will open the aperture 50 and water will pass from the upper heater unit 35f into the outlet channel 49. Also when the valve disk member 58 closes the aperture 50, the apertures 54 will be uncovered so that the water will pass from the upper boiler unit 35f into the by-pass channels 51 and 60.

The characteristics of the bellows 56 is such that the latter will not open to permit water to pass into the channel 49 and thence into the outlet 14 until the water has reached the predetermined temperature which is sufficient to cause the radiating system to operate efficiently. A temperature of about 130 degrees Fahrenheit has been found to be suitable. The by-pass 60 as previously mentioned is connected with the recess 48 so that when the temperature of the water emerging from the boiler is such that the thermostatic valve 45 closes the aperture 50 and opens the apertures 54 so that the water will be recirculated through the pump 30 and into the boiler, a small amount of water will be by-passed through the by-pass 60 into the reservoir 20 to gradually raise and maintain the temperature of the water therein. During the time when the water is below the temperature necessary for the thermostat valve 45 to open the aperture 50, all of the reservoir thermostats 21b, 21c, 21d, 21e and 21f will be closed so that all of the electric heaters in the boiler will be energized. This will cause the temperature of the water to increase at the maximum rate and when the temperature of the water becomes high enough the thermostat valve 45 will expand, moving the valve disk 58 to the right, as viewed in Figure 6, opening the aperture 50 permitting water to flow into channel 49 at the same time the flange 59a of the valve disk 59 will close the apertures 54 and prevent the water from re-circulating through channel 51 back into the boiler. It will be readily apparent that the water will also be closed off from the by-pass 60. After the temperature of the water rises sufficiently to open the aperture 50 and to close the apertures 54, if the pump 30 is operated the water will flow through the outlet pipe 14 into the heat radiating system represented by the coils 12, 13 and back into the tank or reservoir 20 through the return or inlet pipe 15.

As previously mentioned, the thermostatic element 21b is preferably set at a cut off temperature of 80 degrees. The other thermostatic elements are set at 2 degree intervals so that the element 21c will have a cut off temperature of 82 degrees, element 21d will have a cut off temperature of 84 degrees, element 21e will have a cut off temperature of 86 degrees, and element 21f will have a cut off temperature of 88 degrees. It has been found that the setting of the thermostatic elements at the approximately two degree intervals within the temperature range indicated is suitable for controlling the present system where it is desired to maintain a room temperature in the range from 68 degrees to about 76 degrees. It will be noted from the previous description that the electric heater element 40a in the lowermost boiler unit 35a is directly across the circuit of the electric motor 32 which operates the pump 30 and therefore as soon as the house thermostat 70 closes contacts in response to a lower temperature in the room, the pump will begin to circulate the water through the boiler. If the temperature of the water leaving the uppermost boiler unit 35a is not sufficiently high, usually about 130 degrees, the water will be re-circulated through the boiler at the same time that a small amount of water is by-passed into the reservoir. Since the thermostatic elements are all set in progressively higher temperatures, all of the circuits and thermostats will be closed when the temperature is below the lowest setting of the thermostat. This will cause the temperature in the reservoir 20 to rise at the maximum rate. As soon as the temperature passes the cut off temperature of the respective thermostats, each one will cut off the circuit and will deenergize its respective associated electric heater unit in the respective boiler units so that an excessive temperature will not be reached. As soon as the thermostatic valve 45 opens so that the water begins to circulate through the radiating system, the temperature in the room will gradually rise so that the house thermostat 70 will open its contacts and deenergize the input circuit to the heating unit, stopping the circulation of the water and de-energizing the heaters.

The detail overall operation of the heating system is substantially as follows:

Upon initial energization of the electrical system by the house thermostat 70, water in the tank 20 is drawn through the pump 30 and forced into the lowermost unit 35a of the boiler 35. The temperature of the water in the tank being below that to which all of the thermostat elements are adjusted to open, the circuit to each of the electric heater units within the respective boiler units will be closed, heating the water as it passes from one to another of the boiler units. Assuming that the water as it reaches the exit end 61 of the uppermost boiler unit has not yet been heated to the minimum temperature required for effective operation of the heating system, the bellows 56 of the valve 45 will not have been expanded sufficiently to project the valve stem 57 and disk 58 beyond the aperture 50 to permit water to flow therethrough to the channel 49 and outlet pipe 14. Likewise apertures 54 in the valve casing member 53 will be uncovered so that water will be by-passed into the valve seat recess 48 and thence back into the pump 30 through the channel 51 and into the tank 20 through the by-pass channel 60, the water thus repeating the portion of the cycle thus far described.

When the temperature of the water is raised sufficiently to expand the bellows 56 to open the aperture 50 to flow of water, the apertures 54 will be closed by the valve disk member 59, and all the water will be circulated by the pump 30 through the outlet pipe 14, coils 12, 13, and back into the tank 20 through return or inlet pipe 15. As the temperature of the water is further raised into the range of temperatures to which the electric thermostat elements are adjusted, the electric heater units will be successively de-energized. Thus, as the temperature of the water reaches the highest temperature setting of these thermostat elements all of the heater elements will be de-energized and thereafter the cycle of control will be repeated.

From the foregoing description it will be readily apparent that by the present invention a novel heating system is provided in which there is a system reservoir provided between the return from the heat radiating system and the boiler, the reservoir being provided with a plurality of electric thermostat units which are adapted to control independently individual heating units in the boiler. In addition to the heater units which are controlled in the thermostat system reservoir, there is a single heater unit which is in parallel with the motor circuit which is sufficient to maintain the heating system for minimum desired temperatures. In accordance with this system the water returning from the heat radiating system controls the energization of additional heat generating units such as the electric heater units to supply additional heating capacity. In this way a more uniform temperature control is provided and additional heating capacity is added to the system in accordance with the demands of the system. Although the system is described as utilizing electrical heater units, it will be readily apparent to those skilled in the art that any other type of conventional heating unit such as heating unit which may be operated by gas or oil for example, may be utilized.

While but one particular embodiment of the invention has been particularly shown and described, it is distinctly understood that the invention is not limited thereto, but that various modifications may be made in the invention without departing from the spirit and scope thereof, and it is desired, therefore, that only such limitations shall be placed thereon as are imposed by the prior art and are set forth in the appended claims.

What is claimed is:

1. A heating system comprising, a reservoir containing a fluid medium for conducting heat through the system, a plurality of temperature sensitive means disposed in said reservoir each adjusted to be actuated at slightly spaced temperatures progressively within a selected temperature range, a plurality of boiler units intercoupled to form a series fluid circulating system each having heat generating means therein coupled with a distinct one of said temperature sensitive means operative to be energized through actuation of said temperature sensitive means, circulating means coupled into said system operative to circulate said fluid medium through said system, and closed path fluid medium conducting means coupled between the last in the series of said boiler units and said reservoir and extending through the space to be heated to radiate the heat in said fluid medium into said space.

2. A heat system comprising a reservoir adapted to receive a reserve supply of heat exchange medium, a plurality of temperature responsive elements disposed in said reservoir and each adjusted to sequentially and progressively increasing cut off temperatures, boiler means having a plurality of heat generating units therein, at least some of which are adapted to be energized independently each by one of said temperature responsive means, circulating means coupled into said system operative to circulate said heat exchange medium therethrough, a closed path heat radiating system coupled between said boiler means and said reservoir and adapted to be placed in a space or area to be heated, by-pass fluid conductor means coupled between the juncture of said boiler means with said closed path radiating system and a point in said system ahead of the entrance into said boiler means, and temperature responsive valve means disposed at said juncture normally closing said closed path radiating system to introduction of said medium therein and opening said by-pass means to recirculation of said medium through said reservoir and said boiler means, said valve means being operative in response to a preselected temperature of said heat exchange medium to open said closed path system to admission of said medium therein and close said by-pass system to recirculation of said medium therethrough.

3. In a heating system the combination recited in claim 2 and a second by-pass fluid conductor forming a constricted conduit between the outlet side of said boiler and said reservoir for continuously recirculating a portion of said medium from said boiler means to said reservoir to facilitate the heating of the heat exchange medium in said reservoir.

4. A heating system comprising, a reservoir adapted to contain a heat exchange medium for conducting heat through the system, a plurality of temperature sensitive means disposed in said reservoir adjusted to sense slightly spaced temperatures in a progressive series within a selected range of temperatures and to close an electrical circuit therethrough when the temperature is below the temperature adjustment, a plurality of boiler units coupled in series each having heat generating means therein electrically energized through the electrical circuit through one of said temperature sensitive means, circulating means coupled between said reservoir and said boiler units operative to circulate the fluid medium through said system, and closed path fluid conductor heat radiation means coupled between the last in said series of boiler units and said reservoir and extending through the space to be heated.

5. A heating system comprising, a reservoir adapted to contain a heat exchange medium, a plurality of thermostat means disposed in said reservoir adjusted to be actuated at slightly different temperatures in a progressive series within a selected range of temperatures to close an electrical circuit therethrough when the temperature is below the temperature adjustment, a plurality of boiler units coupled in series, each having heat generating means therein electrically energized through the electrical circuit associated with one of said thermostat means, circulating means coupled between said reservoir and the first in said series of boiler units operative to circulate the heat exchange medium through said system, and closed path fluid conductor heat radiating means coupled between the last in said series of boiler units and said reservoir and extending through the space to be heated.

6. A heating system comprising a reservoir adapted to contain a heat exchange medium, a plurality of thermostat means disposed in said reservoir adjusted to be actuated at slightly different temperatures in a progressive series within a selected range of temperatures to close an electrical circuit therethrough when the temperature is below the temperature adjustment, a plurality of boiler units coupled in series, each having heat generating means therein electrically energized individually through the electric circuit associated with one of said thermostat means, circulating means coupled between said reservoir and the first in said series of boiler units operative to circulate the heat exchange medium through said system, and closed path fluid conductor heat radiating means coupled between the last in said series of boiler units and said reservoir and adapted to be located in the space to be heated, fluid by-pass conductor means coupled between the juncture of said boiler with said closed path fluid conductor heat radiating means and a point in said system ahead of the entrance to said boiler, and temperature responsive valve means operative to control the flow of the heat exchange medium through said closed path heat radiating means and the flow of said heat exchange medium through said by-pass conductor means when the temperature of said heat exchange medium is below a preselected level.

7. A heating system comprising a a boiler, a heat radiating system, a reservoir, circulating means connected for circulation of a heat exchange medium from one to the other of the above elements in the order named, a plurality of individual heater units in said boiler, a plurality of individual temperature responsive means in said reservoir for controlling the operation of said individual heater units, whereby said heater means are selectively controlled by the temperature of the water returning from said radiating system, by-pass means between the juncture between said boiler and said radiating system for by-passing a small quantity of the heat exchange medium into said reservoir and temperature responsive means disposed at said juncture normally closing said closed path radiating system to introduction of said medium therein and opening said by-pass means to recirculation of said medium through said reservoir and said boiler means, said valve means being operative in response to a preselected temperature of said heat exchange medium to open said closed path system to admission of said medium therein and close said by-pass system to recirculation of said medium therethrough.

JOHN C. HOLMES.

REFERENCES CITED

The following references are of record in the file of this patent:

UNITED STATES PATENTS

| Number | Name | Date |
|---|---|---|
| 999,710 | Freas | Aug. 1, 1911 |
| 1,369,702 | Oca-Balda | Feb. 22, 1921 |
| 1,391,329 | Lennig | Sept. 20, 1921 |
| 2,058,769 | Brown | Oct. 27, 1936 |